UNITED STATES PATENT OFFICE.

BENJAMIN A. EARL, OF PHILADELPHIA, PENNSYLVANIA.

IMPROVED COMPOSITION FOR LUBRICATING WOOL.

Specification forming part of Letters Patent No. 38,156, dated April 14, 1863.

*To all whom it may concern:*

Be it known that I, BENJAMIN A. EARL, of Philadelphia, Pennsylvania, have invented or discovered a new Lubricating Compound; and I do hereby declare that the following is a full, clear, and exact description of the mode of producing the same.

From experiment I find that borax-water composed of about three and a half ($3\frac{1}{2}$) ounces of borax to the gallon of water is the best strength of borax-water to use, although this proportion may be varied. This solution is to be then mixed with oil in any desired proportion. I have found that equal proportions of each produce the best result. The oils which answer best are the pure animal or vegetable oils. I find lard-oil, peanut-oil, and olive-oil to be the best. This mixture of borax and water, although peculiarly adapted to the lubrication of woolen fibers, may also be used wherever oil has heretofore been used for lubricating purposes. The importance and advantage of such a lubricator are obvious—its great saving of oil and its perfect freedom from gumming.

The borax-water may be used alone for lubricating undressed or unwashed woolen fibers which contain the natural oil of the animal, as it will unite with the animal oil contained in the wool.

The use of borax-water as above described as a substitute, in whole or in part, for oil is of peculiar importance in the manufacture of wool, as by its use at least thirty per cent. of oil is saved and the gumming of the machinery incident to the use of oil is prevented.

Having thus described my invention or discovery, what I claim, and desire to secure by Letters Patent, is—

The use of borax-water for purposes of lubrication in the manufacture of wool, as above specified.

B. A. EARL.

Witnesses:
WILLIAM CHILD,
CHARLES B. HELFENSTEIN.